United States Patent [19]

Paul et al.

[11] Patent Number: 5,292,538
[45] Date of Patent: Mar. 8, 1994

[54] IMPROVED SUSTAINED ENERGY AND ANABOLIC COMPOSITION AND METHOD OF MAKING

[75] Inventors: Stephen M. Paul, San Clemente, Calif.; H. DeWayne Ashmead, Fruit Heights, Utah

[73] Assignees: Metagenics, Inc., San Clemente, Calif.; Albion International, Inc., Clearfield, Utah

[21] Appl. No.: 918,446
[22] Filed: Jul. 22, 1992
[51] Int. Cl.$^5$ ............................................. A23L 1/305
[52] U.S. Cl. ..................... 426/74; 426/271; 426/656; 426/658
[58] Field of Search ............... 426/74, 271, 656, 658

[56] References Cited
U.S. PATENT DOCUMENTS 3,697,287  10/1972  Winitz ..................................... 426/74
4,725,427  2/1988   Ashmead et al. ...................... 426/591

Primary Examiner—Helen F. Pratt
Attorney, Agent, or Firm—Thorpe, North & Western

[57] ABSTRACT

A composition which provides for sustained energy and nutrition to support an anabolic physiological state in humans comprises a blend of simple sugars and more complex carbohydrates, partially hydrolyzed protein, and, at least, magnesium in the form of an amino acid chelate. Preferably the carbohydrate source is a blend of about 5-45% crystalline fructose and 55-95% glucose polymers by weight. Other ingredients, including lipids, bioavailable minerals in the form of amino acid chelates, anabolic nutrients, vitamins, antioxidants, and lipotropic agents may be added as desired to provide an optimal sustained energy and anabolic nutrition formulation. When administered, the carbohydrate blend, protein source, and amino acid chelates facilitate sustained energy and delivery of nutrients to appropriate sites within the body for efficient utilization in anabolic physiology.

25 Claims, No Drawings

IMPROVED SUSTAINED ENERGY AND ANABOLIC COMPOSITION AND METHOD OF MAKING

FIELD OF THE INVENTION

The present invention relates generally to dietary supplements, and more particularly to a sustained energy and anabolic composition comprising glucose polymers, crystalline fructose, partially hydrolyzed lactalbumin, bioavailable minerals, and, optionally, lipid for use as a nutritional supplement.

BACKGROUND OF THE INVENTION

It is well known that both negative energy balance and muscle catabolism are consequences of physiological stress that often accompanies protein calorie malnutrition, strenuous physical exercise, physical trauma, burn injury, surgical trauma, malnutrition, maldigestion, malabsorption, hyperthyroidism, chemotherapy, radiation therapy, anorexia, cachexia, short bowel syndrome, old age, and sepsis. It is also known that maintaining a positive metabolic energy balance can help to alleviate such problems and also has a sparing effect on muscle catabolism that occurs during strenuous physical exertion causing fatigue.

To properly combat the above symptoms and permit muscle growth, it is essential that appropriate amounts of nutrients be available to supplant those which are utilized. For example, during periods of physiological stress, the body may burn large amounts of energy and may also be depleted of body fluids and minerals. Proper food energy (available calories), hydration, and mineral bioavailability are essential to enable the body to maintain a proper balance in both intracellular and extracellular fluids and to also maintain proper enzymatic functioning, pH balance, osmotic pressure, and the like. Therefore, to promote endurance and facilitate muscle anabolism it is necessary, in addition to water, to provide a sustained source of energy, and also a source of minerals that can be directed to proper cellular and/or tissue sites in the course of the anabolic process.

Currently, many types of sustained energy and anabolic formulas are marketed which are generally made up of different carbohydrates, including corn syrup, high fructose corn syrup, sucrose, fructose, and maltodextrin; proteins, including casein and other proteins from milk and soybean; and lipids, including corn, soy, safflower, and canola oils and medium chain triglycerides. Additionally, many of these prior art formulas contain relatively insignificant quantities of magnesium and are generally high in sodium chloride content. Though these formulas are generally suitable as nutritional supplements, they possess certain inherent deficiencies which detract from their overall utility.

Prior art formulas typically do not contain an adequate carbohydrate balance between readily assimilated simple sugars, for immediate utilization for energy and rehydration, and more complex carbohydrates for sustained endurance over a period of time. Further the prior art formulas do not contain proteins formulated to be optimally absorbed in the small intestine. Moreover, these formulas do not contain appropriate bioavailable forms of minerals for intestinal absorption and transport for utilization as electrolytes, enzyme cofactors, and the like. Additionally, though many prior art formulas contain electrolytes, the electrolytes are not ratio proportioned so as to mimic the levels found in metabolically active cells. Further, the prior art formulas do not contain physiological significant levels of magnesium in bioavailable form. Though magnesium is essential to maximum endurance and many athletes are magnesium deficient, potent levels of magnesium are not included in the prior art formulas since such levels are in a form not readily assimilated by the body and usually cause diarrhea or other gastrointestinal disorders. Further, most of these formulas do not contain anabolic nutrients such as L-carnitine, vanadyl sulfate, pyridoxine α-ketoglutarate, and inosine. Further, most of these formulas do not contain antioxidants, such as selenium, N-acetyl cysteine, and lipoic acid, to counteract harmful free radicals and oxidants. Further, most of these formulas do not contain lipotropic agents, such as choline, inositol, pantetheine, and betaine hydrochloride, to enhance utilization of lipids.

It would therefore be beneficial to provide a composition that contains an optimal balance of carbohydrates, protein, and bioavailable minerals and, optionally, specific anabolic nutrients, antioxidants, lipids, and lipotropic agents. Importantly, the inclusion of sufficient levels of magnesium and other minerals in bioavailable form without producing the aforementioned undesirable side effects would be of great advantage.

OBJECTS AND SUMMARY OF THE INVENTION

It is therefore an object of the present invention to provide a sustained energy and anabolic composition for use as a nutritional supplement in a human being (or other warm blooded animal).

It is also an object of this invention to provide a composition which, when ingested, will maintain and/or enhance endurance and/or anabolism in the subject even though symptoms of physiological stress may not be evident.

A still further object of the invention is to provide a method for promoting endurance and anabolism by use of a composition containing an optimal blend of carbohydrates, partially hydrolyzed lactalbumin, and minerals, including magnesium, in a form which the body recognizes and easily assimilates.

Another object of the invention is to provide a method and composition for promoting endurance and anabolism containing, in addition to a blend of carbohydrates, partially hydrolyzed lactalbumin, and minerals, additional anabolic nutrients along with desired amounts of lipids, other vitamins, antioxidants, and/or lipotropic factors.

These and other objects may be realized by providing a composition containing a blend of simple sugars and more complex carbohydrates, partially hydrolyzed lactalbumin, and, at least, magnesium in the form of an amino acid chelate. Other ingredients, including lipids, anabolic nutrients, vitamins, other minerals (also present as amino acid chelates), antioxidants, and lipotropic factors may be added as desired to provide an optimal endurance and anabolic formulation.

DETAILED DESCRIPTION OF THE INVENTION AND THE PREFERRED EMBODIMENTS

The following discussion is included for purposes of describing the present invention and illustrating a preferred embodiment thereof and is not intended to be limiting in scope of the specific formulas or compositions disclosed. As previously stated, the present invention comprises a composition for use as a nutritional supplement for purposes of providing sustained energy and promoting anabolism. The manner in which the composition provides these specific effects will be discussed in greater detail below.

With regard to sustained energy and anabolic formulations, it has been found that those which contain a blend of glucose polymers and fructose as the carbohydrates are superior to water and other types of sweetened beverages fortified with electrolytes. In this respect, glucose, fructose and electrolyte blends are generally considered to be the most desirable sustained energy and anabolic formulas in that they provide the fluids and minerals needed to efficiently utilize metabolic energy. The addition of readily utilizable proteins or amino acids to the formula, when present in sufficient amounts, is also helpful for increasing endurance. This is primarily due to the muscle sparing and energy effects of supplementary amino acids taken during exercise. As such, to be effective, sustained energy and anabolic formulations must generally contain properly blended fructose and glucose polymers, protein, and minerals which, when possible, are present as amino acid chelates Of the calorie sources, carbohydrates are more readily utilizable than proteins or lipids to provide a source of energy, for growth and maintenance of body tissue and to regulate body processes. The provision of energy is the predominant role of carbohydrates and must be satisfied at the expense of the other nutritive roles if there are insufficient nutrients to accomplish these functions. Carbohydrates are made up of simple sugars or monosaccharides, oligosaccharides (such as di- and trisaccharides), and polysaccharides.

Of the simple sugars, the hexoses (glucose and fructose in particular) are the most important in energy production and in regulating body processes. When simple sugars are metabolized, energy is released However, to be utilized as a source of energy in the body, carbohydrates must first be degraded into simple sugars. Then metabolic processes convert the simple sugars into various products such as carbon dioxide and water, or alcohols and, in the case of fermentation in muscular tissues, to lactic acid, accompanied by the release of energy Actually, about 20 percent of simple sugar metabolism gives rise to lactic acid production. These simple sugars or monosaccharides are also utilized as raw materials for synthesis of a variety of organic compounds such as steroids, amino acids, purines, pyrimidines, complex lipids and polysaccharides.

Of the various simple sugars, glucose is the most prevalent as a base source of energy. However, glucose stimulates the production of insulin which is required for proper glucose metabolism Fructose, on the other hand, does not require insulin to enter certain cells of the body and therefore results in a smooth indirect flow into the bloodstream and from there to the brain and other portions of the body. Moreover, fructose also promotes a more rapid emptying of the stomach. In not delaying gastric emptying there is a reduced feeling of bloating and also a more rapid delivery of the nutrients into the small intestine for uptake into the portal blood Both of these simple hexose sugars are readily assimilated and metabolized.

Because of the relative ease with which fructose is assimilated, coupled with the fact that it does not require insulin for metabolism, it is the simple sugar of choice for use in the present invention. Fructose, or fruit sugar, is obtained from fruit sources or from the hydrolysis of sucrose. Sucrose, or table sugar, is a disaccharide made up of glucose and fructose and, upon hydrolysis, yields one molecule of each simple sugar. Fructose is available in various forms but high crystalline fructose is preferred.

The higher sugars and polysaccharides supply a more sustained source of energy. Most polysaccharides, e.g., starch, glycogen, and dextrin, yield glucose as the end-product of complete hydrolysis and are therefore referred to as "glucose polymers" or complex carbohydrates.

Starch, which occurs abundantly in grains, tubers, and fruits is largely the source of carbohydrates for humans. Starch, corn starch in particular, is often hydrolyzed to obtain corn syrup or corn syrup solids of varying degrees of sweetness depending upon the degree or extent of hydrolysis. The "glucose polymers" used in the present invention are products of hydrolysis of corn starch which, for purposes of the present invention, may be referred to as maltodextrins and corn syrup solids. As referred to above, there are various corn syrup solids of varying degrees of sweetness depending upon the number of glucose units in the polymer chain. The shorter the chain the sweeter will be the product. The end products of hydrolysis of corn starch are the disaccharide maltose, which consists of two glucose units, and finally, glucose.

The blending of fructose with glucose polymers provides a formulation which provides a source of energy which begins to be assimilated immediately upon ingestion and continues over a sustained period of time, progressing from the assimilation of fructose (and glucose if present) to the mannose and glucose polymers as they are hydrolyzed by the enzymatic processes of the body e.g., by the amylases of the saliva and pancreatic secretions, and the glucosidases and maltases in the intestine. Preferably from about 55 to 95% by weight of the carbohydrate will be made up of glucose polymers with the remaining about 5 to 45% being fructose. Optimally, the compositions will contain about 85% by weigh glucose polymers and about 15% by weight fructose.

Readily utilizable proteins and amino acids also prove helpful for increasing endurance. This is primarily due to the muscle sparing and energy effects of supplementary amino acids taken during exercise. To be effective, sustained energy and anabolic formulations must generally contain properly blended glucose polymers, fructose, minerals, and proteins and/or amino acids. Currently marketed sustained energy and anabolic formulations contain proteins and amino acids from many different sources, such as soybean and milk. Casein, with a protein efficiency ratio of 100, is the industry standard. By comparison, lactalbumin, a protein found in whey, has a higher protein efficiency ratio than casein, in the range of 105-115. Further, partially hydrolyzed lactalbumin, comprised of di- and tripeptides as well as longer chain oligo- and polypeptides will be more easily assimilated than either casein or undigested lactalbumin. Preferably the hydrolysis will be carried out to the extent that at least 40% of the hydrolyzed protein will have a mean molecular weight of less than 500 daltons. The hydrolysis may be carried out by any known means, e.g., acid or base hydrolysis or series of steps involving both acids and bases. Enzymatic hydrolysis with proteases, such as are obtained from the pancreas, is particularly preferred. Thus, partially proteolyzed lactalbumin is to be preferred over other protein sources in an optimum sustained energy and anabolic formulation. As used herein the terms "hydrolyzed protein" and "predigested protein" are synonymous.

Bioavailable forms of magnesium, potassium, and other minerals, such as manganese, zinc, iron, boron, copper, molybdenum, and chromium, which are utilized in facilitating and sustaining endurance and anabolism, are made by chelating or complexing the mineral with an amino acid or peptide ligand. The ligand to mineral ratio in these chelates is at least 1:1 and, except for potassium, is preferably 2:1 or higher. The molecular weight of these amino acid chelates is not greater than 1,500 daltons and preferably does not exceed 1,000 daltons. Such amino acid chelates are stable and are generally taught in the prior art to be absorbed intact through the intestinal tract via an active dipeptide transport system. It has not previously been known that, when properly administered, such chelates can cooperate with properly blended carbohydrates and protein to affect sustained energy and anabolism. Such amino acid chelates have a stability constant of between about $10^6$ and $10^{16}$. A more detailed description of such chelates and the method by which they are absorbed through the intestine is documented in Ashmead et al., U.S. Pat. No. 4,863,898 which issued Sep. 5, 1989, and also in Ashmead et al., *Intestinal Absorption of Metal Ions and Chelates*, published by Charles C. Thomas, Springfield, Ill., 1985. Boron, as a metalloid, may be present more in the form of a complex or salt than as an actual chelate.

This invention, however, is not directed to metal uptake into tissues or metal transport across the intestine for absorption in the blood. Therefore, although amino acid chelates and some of the uses to which they are applicable are documented in the art, there is no teaching that proper formulations and administration of such chelates can affect sustained energy and anabolism when coadministered with properly formulated carbohydrates and protein as defined above.

To clarify what is meant by the term "amino acid chelate" the *American Association of Feed Control Officials* has issued the following official definition: "amino acid chelate—a metal ion from a soluble salt with amino acids with a mole ratio of one mole of metal to one to three (preferably two) moles of amino acids to form coordinate covalent bonds. The average weight of the hydrolyzed amino acids must be approximately 150 and the resulting molecular weight of the chelate must not exceed 800." It is also now well documented that amino acid chelates can be prepared from metal ions which do not come from soluble salts. Ashmead, U.S. Pat. No. 4,599,152, and Ashmead, U.S. Pat. No. 4,830,716, both disclose methods of preparing pure or pharmaceutical grade amino acid chelates using metal sources other than soluble metal salts. While, the manner these amino acid chelates are made is not essential to the present invention, provided they meet the criteria stated above, it is preferable that pharmaceutical grade chelates be used to minimize the presence of unwanted impurities such as sulfate ions, excess chloride, and the like.

As referenced above, various studies have found that minerals in the form of amino acid chelates, composed of amino acid ligands or combinations of amino acid and vitamin acid ligands (e.g. glycinates, arginates, and nicotinate glycinates), render the minerals more readily absorbable. The reason for this is the transport of amino acid chelates across the intestinal mucosa and into the portal circulation is accomplished by an amino acid transport mechanism and not by traditional mineral ion transport. Once in the blood, the amino acid chelates do not bind directly to serum proteins, including albumin, ceruloplasmin, transferrin, and in the like, but are transported directly to target tissues in the chelated form. Thereafter, the mineral is released from the chelate intracellularly. Importantly, this direct transport results in greatly improved bioavailability of the minerals to organs and cells and works independently of either mineral-saturated or reduced concentrations of serum proteins. Additionally, unlike most conventional mineral salts that are commercially available, amino acid chelates do not cause changes in bowel habits after oral administration. This is in contrast to notable examples of conventional iron salts such as iron sulfate, which may cause constipation, and magnesium citrate, which commonly causes loose stools or diarrhea.

While the amino acid or peptide ligands used in formulating the amino acid chelates are in themselves important nutrients, they may or may not be present in sufficient amounts to materially contribute as protein calorie sources in the present invention. In any event they are important factors in furthering the cause of sustained energy and anabolism.

In accordance with a preferred embodiment of the present invention, there is provided a sustained energy and anabolic composition for use as a nutritional supplement The formulation preferably includes glucose polymers, crystalline fructose, partially hydrolyzed protein, amino acid-chelated minerals, and, optionally, lipids in optimal ratios to assure sustained energy and optimal delivery of the minerals to various tissues and organs which are essential for sustaining an anabolic physiological state in humans.

In its most fundamental form, the sustained energy and anabolic nutrition formulations of the present invention include a blend of glucose polymers, fructose, partially hydrolyzed protein, lipids (optional), and magnesium amino acid chelate in the following ranges:

| BASIC INGREDIENTS | RANGES IN PARTS BY WEIGHT | |
|---|---|---|
| | Broad | Preferred |
| Glucose Polymers | 25–100 | 50–75 |
| Crystalline Fructose | 5–20 | 8–15 |
| Hydrolyzed Protein | 5–25 | 10–20 |
| Lipid | 0–20 | 0.5–5 |
| Magnesium | 50–500 × $(10^{-3})$ | 100–200 × $(10^{-3})$ |
| Amino Acid Ligand | 0.15–6.7 | 0.6–2.5 | with the proviso that the mole ratio of amino acid ligand to magnesium is in the range of at least 1:1 and is preferably 2:1.

It is also preferable that the formulation contain one or more additives selected from the group consisting of a mixture of bioavailable minerals and a mixture of specific anabolic nutrients in proportions that enhance the utilization of carbohydrates, proteins, and lipids. Preferred formulations and ranges of these ingredients are:

| BIOAVAILABLE MINERALS | RANGES IN PARTS BY WEIGHT | |
|---|---|---|
| | Broad | Preferred |
| Potassium | 100–500 × $(10^{-3})$ | 100–400 × $(10^{-3})$ |
| Phosphorus | 50–250 × $(10^{-3})$ | 100–200 × $(10^{-3})$ |
| Manganese | 0.5–2 × $(10^{-3})$ | 0.5–2 × $(10^{-3})$ |
| Zinc | 1–10 × $(10^{-3})$ | 1–6 × $(10^{-3})$ |
| Iron | 1–10 × $(10^{-3})$ | 1–6 × $(10^{-3})$ |

-continued

| BIOAVAILABLE MINERALS | RANGES IN PARTS BY WEIGHT | |
|---|---|---|
| | Broad | Preferred |
| Boron | $0-5 \times (10^{-3})$ | $0.1-4 \times (10^{-3})$ |
| Copper | $100-500 \times (10^{-6})$ | $150-450 \times (10^{-6})$ |
| Molybdenum | $1-10 \times (10^{-6})$ | $2-8 \times (10^{-6})$ |
| Chromium | $25-300 \times (10^{-6})$ | $75-200 \times (10^{-6})$ |

The potassium may be present as an amino acid complex having a ligand to metal mole ratio of 1:1 or it may be present as inorganic salt in the form of chloride, phosphate, and the like. The manganese, zinc, iron, boron, copper, molybdenum, and chromium are preferably present as amino acid chelates having ligand to mineral mole ratios of at least 1:1 and preferably 2:1. Chromium may also be present as chromium nicotinate glycinate. As noted above, boron, may be present as a complex or salt instead of being a true chelate under the AAFCO definition. When properly blended into the basic formulation provided above, these ingredients provide a balance of minerals for proper mineral nutrition and for enhancing and sustaining anabolism. For example, chromium nicotinate glycinate is important as a specific glucose tolerance factor (GTF).

A specific anabolic nutrient mixture enhances the utilization of insulin, carbohydrates, protein, and lipid. This mixture includes inosine and one or more optional ingredients selected from the group consisting of L-carnitine, vanadyl sulfate, and pyridoxine α-ketoglutarate. These ingredients may be added to the basic formulation, with or without the presence of the bioavailable minerals or other ingredients, in the following concentrations:

| ANABOLIC INGREDIENTS | RANGES IN PARTS BY WEIGHT | |
|---|---|---|
| | Broad | Preferred |
| L-Carnitine | $0-250 \times (10^{-3})$ | $1-250 \times (10^{-3})$ |
| Vanadyl Sulfate | $0-10 \times (10^{-6})$ | $1-10 \times (10^{-6})$ |
| Pyridoxine α-Ketoglutarate | $0-250 \times (10^{-3})$ | $1-250 \times (10^{-3})$ |
| Inosine | $25-100 \times (10^{-3})$ | $25-100 \times (10^{-3})$ |

In addition to the above combinations, it may be advantageous to also add vitamins as warranted to supplement and optimize the formulations for purposes of sustained energy and anabolism. Suitable of the vitamins that may be added are the following:

| VITAMIN INGREDIENTS | RANGES IN PARTS BY WEIGHT |
|---|---|
| Vitamin A | 500-5000 international units |
| Vitamin B1 | $0.5-2 \times (10^{-3})$ |
| Vitamin B2 | $0.5-2 \times (10^{-3})$ |
| Vitamin B5 | $10-100 \times (10^{-3})$ |
| Vitamin B6 | $0.5-2 \times (10^{-3})$ |
| Vitamin B12 | $1-5 \times (10^{-7})$ |
| Vitamin D | 50-200 international units |
| Folic Acid | $100-500 \times (10^{-6})$ |
| Niacinamide | $2-10 \times (10^{-3})$ |
| Biotin | $100-300 \times (10^{-3})$ |

In addition to the above combinations, it may be advantageous to add certain specific antioxidants including β-carotene, vitamin E, selenium, N-acetyl cysteine, lipoic acid, and vitamin C. These particular substances provide a protective effect against free radicals and oxidative damage that can occur in the gastrointestinal system as well as various target tissues including the liver, lungs, kidneys, and blood. These ingredients may be added to the basic formulation in the following concentrations:

| ANTIOXIDANT INGREDIENTS | RANGES IN PARTS BY WEIGHT | |
|---|---|---|
| | Broad | Preferred |
| β-Carotene | 500-5000 IU | 1000-3000 IU |
| Vitamin E | 10-100 IU | 10-60 IU |
| Selenium | $0-25 \times (10^{-6})$ | $1-25 \times (10^{-6})$ |
| N-Acetyl Cysteine | $0-500 \times (10^{-3})$ | $1-300 \times (10^{-3})$ |
| Lipoic Acid | $0-200 \times (10^{-6})$ | $1-200 \times (10^{-6})$ |
| Vitamin C | $10-100 \times (10^{-3})$ | $10-60 \times (10^{-3})$ |

Selenium may be present either as a salt, e.g. sodium selenite, or as selenomethionine, an amino acid chelate having ligand to mineral mole ratios of at least 1:1 and preferably 2:1.

In addition to the above-mentioned ingredients, the composition may include certain specific lipotropic agents to increase metabolism of fat in the body by hastening the removal of or decreasing the deposit of fat in the liver. These ingredients include choline, inositol, pantetheine, and betaine hydrochloride. They may be added to the basic formulation, with or without other ingredients mentioned above, in the following amounts:

| LIPOTROPIC AGENTS | RANGES IN PARTS BY WEIGHT | |
|---|---|---|
| | Broad | Preferred |
| Choline | $25-100 \times (10^{-3})$ | $40-90 \times (10^{-3})$ |
| Inositol | $25-100 \times (10^{-3})$ | $40-90 \times (10^{-3})$ |
| Pantetheine | $0-250 \times (10^{-3})$ | $1-250 \times (10^{-3})$ |
| Betaine HCl | $0-100 \times (10^{-3})$ | $1-100 \times (10^{-3})$ |

The composition is preferably manufactured in powder form by agglomerating the raw material ingredients in a suitable agglomerator so as to result in a finished product having a uniform composition with the precise proportions of the components. The agglomerated material is then packaged in a suitable container. The powdered composition may then be mixed with water for consumption, although other liquid sources such as fruit juices, milk, or beverages can be substituted. If desired, the product can also be formulated in liquid form. When reconstituted in water, the carbohydrate content is not greater than 10% by weight and is generally between about 6 and 7 percent. The preferred daily dosage of the composition ranges from 0.03 to 1.0 grams, based on the powdered composition, per kilogram of body weight. The daily dosage can be ingested in a single serving or divided into various servings and taken at intervals. Preferably, the composition will be taken prior to or following strenuous exercise or upon the notice of symptoms of physiological stress.

Other ingredients, such as flavoring agents, stabilizers, gums, coloring agents, citric acid, and the like may also be utilized to maximize flavor, tartness, compatibility, and texture.

Advantageously, the present formulation optimally contains a carbohydrate balance consisting of approximately 85% (w/w) glucose polymers and 15% (w/w) crystalline fructose The inclusion of this carbohydrate blend has the net effect of helping to maintain a positive metabolic energy balance, both immediately after ingestion and over a sustained period of time, and also has a sparing effect on muscle catabolism. The advantages attendant to these effects are significant in that both negative energy balance and muscle catabolism are consequences of physiological stress that often accompanies protein calorie malnutrition, strenuous physical exercise, physical trauma, burn injury, surgical trauma, malnutrition, maldigestion, malabsorption, hyperthyroidism, chemotherapy, radiation therapy, anorexia, cachexia, short bowel syndrome, old age, and sepsis. The aforementioned ratio of the glucose polymers and crystalline fructose also helps to delay the onset of fatigue that occurs during strenuous physical exertion.

The formulation also contains hydrolyzed protein and, optionally, a fat or lipid source to provide sustained energy and nutrients for muscle growth. Proteins and lipids are both energy-rich foods and provide nutritional balance over formulations containing only carbohydrates as a source of calorie energy. However, proteins and lipids are not utilized as quickly by the body as are simple sugars because the digestive process is more complicated and they have to be broken down into simpler metabolites before use by the body for energy production or as building blocks for muscle growth. Thus, the proteins and lipids release energy in a manner consistent with sustained energy and anabolism. As stated previously, in the preferred embodiment, the preferred protein is lactalbumin that has been partially hydrolyzed or digested with proteolytic enzymes so that at least 40% of the lactalbumin has a mean molecular weight of less than 500.

The formulation contains significantly high levels of the mineral magnesium. As is well known, strenuous physical activity and mental and physical stress can cause a decline in tissue magnesium levels as a result of hypermetabolic compensation and the increased elaboration of catecholamines, glucagon, and mineral corticoids. Consequently, the present composition provides the necessary magnesium to replenish reduced magnesium levels in the body. Importantly, due to the inclusion of the magnesium as an amino acid chelate in the composition, there are no side effects of intestinal irritability, loose stools, or diarrhea after ingestion of the present compositions which are typically associated with the intake of high levels of magnesium as an inorganic salt. Additionally, the high level of magnesium found in the present composition mimics intracellular mineral ratios of muscle cells to significantly increase cell metabolism and energy production during prolonged exercise.

In the preferred embodiment, the composition also contains specific anabolic nutrients, including chromium nicotinate glycinate and vanadyl sulfate, in proportions which enhance the utilization of insulin and carbohydrates, lipids, and proteins. Additionally, the inclusion of the ingredient inosine in the present composition greatly enhances oxygenation of tissue The electrolyte ratio in the present composition mimics that found in metabolically active cells, and as such serves to significantly enhance cellular metabolism and biological energy production as well as removal of metabolic waste products during periods of intense physical activity or stress. In addition to the electrolyte ratios paralleling those found in muscle cells, as previously indicated, the electrolytes which can be delivered via an amino acid transport system makes them immediately available to maintain optimal cellular metabolism. Importantly, the amino acid transport system allows for high mineral delivery and does not cause adverse gastrointestinal side effects.

The present composition further contains certain B-complex and other vitamins that are typically depleted during prolonged exercise, periods of strenuous physical activity and other causes of physiological stress. The added source of B vitamins provided by the present composition helps to replenish such losses and further assist as coenzymes in the production of metabolic energy and building of muscle.

In the preferred embodiment, the composition also contains certain antioxidants and lipotropic agents that optimize production of metabolic energy and building of muscle. The antioxidants neutralize the harmful effects of free radicals and oxidants, whereas the lipotropic agents increase metabolism of fat in the body by hastening the removal of or decreasing the deposit of fat in the liver.

When reconstituted with the appropriate amount of water, the present composition is isotonic and as a result, will not cause any bowel irregularity, even with repeated use during relatively short period of time. Additionally, when properly reconstituted with water, the composition contains a proper concentration of carbohydrates that will not delay gastric emptying. This reduces feelings of bloating and allows for rapid delivery of the components into the lumen of the small intestine for uptake by the mucosa into the portal circulation. The present composition is further isotonic pH-regulated which breaks clean from the mouth with no chalky or sticky feel. Additionally, the composition rapidly empties from the stomach causing no gastric discomfort and no changes in bowel habits.

EXAMPLE

The following formulae represent specific embodiments of the invention. These may be prepared in the manner indicated above by blending together the stated raw material ingredients in an agglomerator so as to result in a finished product having a uniform composition with the precise proportions of the components as indicated. The agglomerated material is then packaged in a suitable container. In the preferred embodiment, the composition comprises the following ingredients stated in amounts by weight:

| INGREDIENTS | FORMULATION NUMBER | | | | | | | |
|---|---|---|---|---|---|---|---|---|
| | I | II | III | IV | V | VI | VII | VIII |
| Glucose Polymers (g) | 62.1 | 75.0 | 60.0 | 50.0 | 100.0 | 60.0 | 55.0 | 25.0 |
| Crystalline Fructose (g) | 11.0 | 15.0 | 10.0 | 8.0 | 20.0 | 10.0 | 12.0 | 5.0 |
| Lactalbumin (g) | 13.5 | 20.0 | 5.0 | 25.0 | 20.0 | 12.0 | 15.0 | 10.0 |
| Lipid (g) | 1.3 | 4.0 | — | 5.0 | — | 0.6 | 2.0 | — |
| Magnesium (mg) | 160.3 | *500.0 | *110.2 | *183.0 | 155.0 | *145.8 | 170.0 | 64.5 |
| Amino Acid Lig (mg) | $^a$990.0 | $^b$5200.0 | $^c$996.0 | *1130.0 | $^d$1920.0 | $^e$1560.0 | $^f$1260.0 | $^a$398.0 |
| Potassium (mg) | 282.1 | 360.0 | 100.0 | 330.0 | — | — | 300.0 | 200.0 |
| Phosphorus (mg) | 160.3 | 180.0 | 50.0 | 140.0 | — | — | 160.0 | 100.0 |
| Manganese (mg) | $^1$1.3 | $^1$1.5 | 0.5 | 1.0 | — | — | $^1$1.4 | $^1$1.5 |
| Zinc (mg) | $^2$3.2 | $^2$2.1 | 1.0 | 1.0 | — | — | $^2$2.4 | $^2$5.0 |

-continued

| INGREDIENTS | FORMULATION NUMBER | | | | | | | |
|---|---|---|---|---|---|---|---|---|
| | I | II | III | IV | V | VI | VII | VIII |
| Iron (mg) | [3]1.9 | [3]2.1 | 1.0 | 1.0 | — | — | [3]2.4 | [3]5.0 |
| Boron (mg) | [4]1.0 | [4]1.0 | — | 0.5 | — | — | [4]0.8 | [4]1.5 |
| Copper (μg) | [5]320.5 | [5]200.0 | 350.0 | 380.0 | — | — | [5]300.0 | [5]260.0 |
| Molybdenum (μg) | [6]6.4 | [6]2.1 | 6.0 | 4.8 | — | — | [6]4.4 | [6]7.0 |
| Chromium (μg) | [7]128.2 | [7]150.0 | [8]100.0 | 190.0 | — | — | [7]140.0 | [7]156.0 |
| L-Carnitine (mg) | 32.1 | — | 48.0 | — | — | 20.0 | 20.0 | 93.0 |
| Vanadyl Sulfate (μg) | 6.4 | 10.0 | 3.0 | — | — | 3.0 | 7.3 | 10.0 |
| Pyr. α-Ketoglutarate (mg) | 32.1 | 160.0 | 35.0 | — | — | 30.0 | 28.0 | 13.0 |
| Inosine (mg) | 64.1 | 85.0 | 25.0 | — | — | 70.0 | 75.0 | 30.0 |
| Vitamin A (IU) | 1602.6 | 1500.0 | — | 1450.0 | — | — | 2000.0 | 1250.0 |
| Vitamin B1 (mg) | 1.0 | 1.8 | — | 1.0 | — | — | 1.0 | 1.5 |
| Vitamin B2 (mg) | 1.2 | 1.5 | — | 1.0 | — | — | 1.0 | 2.0 |
| Vitamin B5 (mg) | 32.1 | 30.0 | — | 50.0 | — | — | 25.0 | 42.0 |
| Vitamin B6 (mg) | 1.3 | 1.5 | — | 1.0 | — | — | 1.0 | 0.8 |
| Vitamin B12 (μg) | 3.8 | 4.0 | — | 2.9 | — | — | 3.5 | 4.3 |
| Vitamin D (IU) | 128.2 | 164.0 | — | 164.0 | — | — | 120.0 | 100.0 |
| Folic Acid (μg) | 256.4 | 244.0 | — | 310.0 | — | — | 240.0 | 227.0 |
| Niacinamide (mg) | 6.4 | 4.0 | — | 7.0 | — | — | 4.0 | 5.0 |
| Biotin (mg) | 192.3 | 225.0 | — | 175.0 | — | — | 180.0 | 203.0 |
| B-Carotene (IU) | 1602.6 | 1500.0 | — | — | — | — | 2000.0 | 1250.0 |
| Vitamin E (IU) | 19.2 | 15.0 | — | — | — | — | 25.0 | 18.0 |
| Selenium (μg) | [9]16.0 | 14.0 | — | — | — | — | 20.0 | 18.0 |
| N-Acetyl Cysteine (mg) | 64.1 | 88.0 | — | — | — | — | 130.0 | 130.0 |
| Lipoic Acid (μg) | 64.1 | 88.0 | — | — | — | — | 56.0 | 80.0 |
| Vitamin C (mg) | 19.2 | 15.0 | — | — | — | — | 25.0 | 53.0 |
| Choline (mg) | 64.1 | 55.0 | — | 73.0 | — | — | 70.0 | 48.0 |
| Inositol (mg) | 64.1 | 55.0 | — | 73.0 | — | — | 74.0 | 63.0 |
| Pantetheine (mg) | 32.1 | 60.0 | — | 22.0 | — | — | 45.0 | 23.0 |
| Betaine HCL (mg) | 64.1 | 70.0 | — | 53.0 | — | — | 81.0 | 59.0 |

[1] = manganese arginate
[2] = zinc arginate
[3] = iron glycinate
[4] = boron citrate aspartate glycinate
[5] = copper glycinate
[6] = molybdenum aspartate
[7] = chromium nicotinate glycinate
[8] = chromium glycinate
[9] = selenomethionine
[a] = as a pharmaceutical grade chelate
[b] = glycine
[b] = hydrolyzed protein isolate ave m.w. 125
[c] = mixed amino acids ave m.w. 110
[d] = enzymatic hydrolyzed soy ave m.w. 150
[e] = hydrolyzed casein ave m.w. 130
[f] = mixed amino acids ave m.w. 90

The above compositions may be mixed with a suitable liquid to prepare an 8-12 liquid ounce solution having a solids content of about 0.03 to 1.0 grams per kilogram of body weight, as stated above.

Additional modifications and improvements of the present invention may also by apparent to those skilled in the art. Thus, the particular combinations of parts described and illustrated herein is intended to represent only one embodiment of the invention, and is not intended to service limitations of alternative devices within the spirit and scope of the invention.

We claim:

1. A fructose/glucose/protein blend composition comprising in parts by weight (a) from 25 to 100 parts of glucose polymers; (b) from 5 to 20 parts of fructose; (c) from 5 to 25 parts of a hydrolyzed protein source, the hydrolyzed protein source comprised of at least di- and longer chain peptides and at least 40% of said protein source having a mean molecular weight of less than 500 daltons; (d) from 0 to 20 parts of a lipid source; (e) from 50 to $500 \times (10^{-3})$ parts of magnesium; and from 0.03 to 6 parts of an amino acid ligand source; wherein the magnesium is present as an amino acid chelate formed from said amino ligand source wherein the mole ratio of amino acid ligand to magnesium in said chelate is at least 1:1.

2. A composition according to claim 1 wherein said fructose is crystalline fructose, said magnesium amino acid chelate has a molecular weight not greater than 1,500 daltons and has a stability constant of between about $10^6$ and $10^{16}$, said hydrolyzed protein source is partially hydrolyzed lactalbumin, and said lipid source is present in from 0.1 to 20 parts by weight.

3. A composition according to claim 2 comprising in parts by weight (a) from 50 to 75 parts of glucose polymers; (b) from 8 to 15 parts of fructose; (c) from 10 to 20 parts of a partially hydrolyzed lactalbumin; (d) from 0 to 20 parts of a lipid source; (e) from 100 to $200 \times (10^{-3})$ parts of magnesium; and from 0.06 to 2.4 parts of an amino acid ligand source; wherein said lactalbumin is partially hydrolyzed by treatment with proteolytic enzymes.

4. A composition according to claim 3 further comprising in parts by weight (f) from 100 to $500 \times (10^{-3})$ parts of potassium; (g) from 50 to $250 \times (10^{-3})$ parts of phosphorus; (h) from 0.5 to $2 \times (10^{-3})$ parts of manganese; (i) from 1 to $10 \times (10^{-3})$ parts of zinc; (j) from 1 to $10 \times (10^{-3})$ parts of iron; (k) from 0 to $5 \times (10^{-3})$ parts of boron; (l) from 100 to $500 \times (10^{-6})$ parts of copper; (m) from 1 to $10 \times (10^{-6})$ parts of molybdenum; and (n) from 25 to $300 \times (10^{-6})$ parts of chromium; with the proviso that the manganese, zinc, iron, boron, copper, and molybdenum are present as amino acid chelates having ligand to metal mole ratios of at least 1:1 and the chromium is present as a member selected from the group consisting of an amino acid chelate and chromium nicotinate glycinate and mixtures thereof.

5. A composition according to claim 3 further comprising (o) from 0 to $250\times(10^{-3})$ parts of L-carnitine; (p) from 0 to $10\times(10^{-6})$ parts of vanadyl sulfate; (q) from 0 to $250\times(10^{-3})$ parts of pyridoxine α-ketoglutarate; and (r) from 25 to $100\times(10^{-3})$ parts of inosine.

6. A composition according to claim 3 further comprising (s) from 0.5 to $2\times(10^{-3})$ parts of vitamin B1; (t) from 0.5 to $2\times(10^{-3})$ parts of vitamin B2; (u) from 0.5 to $2\times(10^{-3})$ parts of vitamin B6; (v) from 10 to $100\times(10^{-3})$ parts of vitamin B5; (w) from 1 to $5\times(10^{-6})$ parts of vitamin B12; (x) from 50 to 200 international units of vitamin D; (y) from 100 to $500\times(10^{-6})$ parts of folic acid; (z) from 2 to $10\times(10^{-3})$ parts of niacinamide; (aa) from 100 to $300\times(10^{-3})$ parts of biotin; and (bb) from 500 to 5,000 international units of vitamin A.

7. A composition according to claim 3 further comprising (cc) from 500 to 5,000 international units of β-carotene; (dd) from 10 to 100 international units of vitamin E; (ee) from 10 to $100\times(10^{-3})$ parts of vitamin C; (ff) from 0 to $500\times(10^{-3})$ parts of N-acetyl cysteine; (gg) from 0 to $200\times(10^{-6})$ parts of lipoic acid; and (hh) from 0 to $25\times(10^{-6})$ parts of selenium.

8. A composition according to claim 7 wherein the selenium, when present, is an amino acid chelate having a ligand to metal mole ratio of at least 1:1.

9. A composition according to claim 3 further comprising (ii) from 25 to $100\times(10^{-3})$ parts of choline; (jj) from 25 to $100\times(10^{-3})$ parts of inositol; (kk) from 0 to $250\times(10^{-3})$ parts of pantetheine; and (ll) from 0 to $100\times(10^{-3})$ parts of betaine hydrochloride.

10. A composition according to claim 3 wherein said magnesium amino acid chelate has a ligand to magnesium mole ratio of at least 2:1 and is a pharmaceutical grade chelate.

11. A composition according to claim 4 wherein said magnesium, manganese, zinc, iron, boron, copper, molybdenum, and chromium are all present as amino acid chelates having ligand to mineral mole ratios of at least 2:1 and wherein said chelates are of pharmaceutical grade in purity.

12. A composition according to claim 7 wherein said selenium is present as an amino acid chelate having a ligand to mineral mole ratio of at least 2:1 and wherein said chelate is of pharmaceutical grade purity.

13. A method of providing sustained energy and nutrition for anabolic physiological state in a human which comprises administering to said human an effective amount of a fructose/glucose/protein blend composition comprising in parts by weight (a) from 25 to 100 parts of glucose polymers; (b) from 5 to 20 parts of fructose; (c) from 5 to 25 parts of a hydrolyzed protein source, the hydrolyzed protein source comprised of at least di- and longer chain peptides and at least 40% of said protein source having a mean molecular weight of less than 500 daltons; (d) from 0 to 20 parts of a lipid source; (e) from 50 to $500\times(10^{-3})$ parts of magnesium; and from 0.03 to 6 parts of an amino acid ligand source; wherein the magnesium is present as an amino acid chelate formed from said amino ligand source wherein the mole ratio of amino acid ligand to magnesium in said chelate is at least 1:1.

14. A method according to claim 13 which comprises administering, in liquid form, between about 0.03 to 1.0 grams, based on the powdered composition, per kilogram of body weight of said composition daily.

15. A method according to claim 13 wherein said fructose is crystalline fructose, said magnesium amino acid chelate has a molecular weight not greater than 1,500 daltons and has a stability constant of between about $10^6$ and $10^{16}$, said hydrolyzed protein source is partially hydrolyzed lactalbumin, and said lipid source is present in from 0.1 to 20 parts by weight.

16. A method according to claim 15 comprising in parts by weight (a) from 50 to 75 parts of glucose polymers; (b) from 8 to 5 parts of fructose; (c) from 10 to 20 parts of a partially hydrolyzed lactalbumin; (d) from 0.5 to 5 parts of a lipid source; (e) from 100 to $200\times(10^{-3})$ parts of magnesium; and from 0.06 to 2.4 parts of an amino acid ligand source; wherein said lactalbumin is partially hydrolyzed by treatment with proteolytic enzymes.

17. A method according to claim 16 wherein said composition additionally comprises in parts by weight (f) from 100 to $500\times(10^{-3})$ parts of potassium; (g) from 50 to $250\times(10^{-3})$ parts of phosphorus; (h) from 0.5 to $2\times(10^{-3})$ parts of manganese; (i) from 1 to $10\times(10^{-3})$ parts of zinc; (j) from 1 to $10\times(10^{-3})$ parts of iron; (k) from 0 to $5\times(10^{-3})$ parts of boron; (l) from 100 to $500\times(10^{-6})$ parts of copper; (m) from 1 to $10\times(10^{-6})$ parts of molybdenum; and (n) from 25 to $300\times(10^{-6})$ parts of chromium; with the proviso that the manganese, zinc, iron, boron, copper, and molybdenum are present as amino acid chelates having ligand to metal mole ratios of at least 1:1 and the chromium is present as a member selected from the group consisting of an amino acid chelate and chromium nicotinate glycinate and mixtures thereof.

18. A method according to claim 16 further comprising (o) from 0 to $250\times(10^{-3})$ parts of L-carnitine; (p) from 0 to $10\times(10^{-6})$ parts of vanadyl sulfate; (q) from 0 to $250\times(10^{-3})$ parts of pyridoxine α-ketoglutarate; and (r) from 25 to $100\times(10^{-3})$ parts of inosine.

19. A method according to claim 16 wherein said composition additionally comprises in parts by weight (s) from 0.5 to $2\times(10^{-3})$ parts of vitamin B1; (t) from 0.5 to $2\times(10^{-3})$ parts of vitamin B2; (u) from 0.5 to $2\times(10^{-3})$ parts of vitamin B6; (v) from 10 to $100\times(10^{-3})$ parts of vitamin B5; (w) from 1 to $5\times(10^{-6})$ parts of vitamin B12; (x) from 50 to 200 international units of vitamin D; (y) from 100 to $500\times(10^{-6})$ parts of folic acid; (z) from 2 to $10\times(10^{-3})$ parts of niacinamide; (aa) from 100 to $300\times(10^{-3})$ parts of biotin; and (bb) from 500 to 5,000 international units of vitamin A.

20. A method according to claim 16 wherein said composition additionally comprises in parts by weight (cc) from 500 to 5,000 international units of β-carotene; (dd) from 10 to 100 international units of vitamin E; (ee) from 10 to $100\times(10^{-3})$ parts of vitamin C; (ff) from 0 to $500\times(10^{-3})$ parts of N-acetyl cysteine; (gg) from 0 to $200\times(10^{-6})$ parts of lipoic acid; and (hh) from 0 to $25\times(10^{-6})$ parts of selenium.

21. A method according to claim 20 wherein the selenium, when present, is an amino acid chelate having a ligand to metal mole ratio of at least 1:1.

22. A method according to claim 16 wherein said composition additionally comprises in parts by weight (ii) from 25 to $100\times(10^{-3})$ parts of choline; (jj) from 25 to $100\times(10^{-3})$ parts of inositol; (kk) from 0 to $250\times(10^{-3})$ parts of pantetheine; and (ll) from 0 to $100\times(10^{-3})$ parts of betaine hydrochloride.

23. A method according to claim 16 wherein said magnesium amino acid chelate has a ligand to magnesium mole ratio of at least 2:1 and is a pharmaceutical grade chelate.

24. A method according to claim 17 wherein magnesium, manganese, zinc, iron, boron, copper, molybdenum, and chromium are all present as amino acid chelates having ligand to mineral mole ratios of at least 2:1 and wherein said chelates are of pharmaceutical grade in purity.

25. A method according to claim 21 wherein selenium, when present, is an amino acid chelate having a ligand to mineral mole ratio of at least 2:1 and wherein said chelate is of pharmaceutical grade in purity.

* * * * *